United States Patent [19]

Tokumitsu

[11] Patent Number: 4,531,162
[45] Date of Patent: Jul. 23, 1985

[54] NOISE CONTROL CIRCUIT FOR SLOW-MOTION/STILL-MOTION VIDEO REPRODUCTION SYSTEM

[75] Inventor: Junsuke Tokumitsu, Yokohama, Japan

[73] Assignee: Victor Company of Japan, Ltd., Yokohama, Japan

[21] Appl. No.: 389,241

[22] Filed: Jun. 17, 1982

[30] Foreign Application Priority Data

Jun. 19, 1981 [JP] Japan .................................. 56-94669

[51] Int. Cl.³ .......................... H04N 5/78; G11B 21/04
[52] U.S. Cl. ...................................... 360/10.3; 360/70
[58] Field of Search .......................... 360/10.1–10.3, 360/33.1, 38.1, 74.1, 77, 71, 70; 358/312, 335

[56] References Cited

U.S. PATENT DOCUMENTS

| 4,276,571 | 6/1981 | Sakamoto | 360/10.2 |
| 4,306,255 | 12/1981 | Misaki et al. | 360/10.3 |

FOREIGN PATENT DOCUMENTS

| 2853392 | 6/1979 | Fed. Rep. of Germany . | |
| 1427100 | 3/1976 | United Kingdom . | |
| 2009998B | 6/1979 | United Kingdom . | |
| 1587798 | 4/1981 | United Kingdom . | |
| 2078430A | 1/1982 | United Kingdom . | |
| 2104275 | 3/1983 | United Kingdom | 360/10.3 |

OTHER PUBLICATIONS

"Microprocessor Controlled Variable Play-Back Speed System for Video Tape Recorder", Azuma et al., IEEE Trans. Cons. Elec., vol. CE-26, No. 1, Feb. 1980, pp. 121–128.

Primary Examiner—Aristotelis M. Psitos
Attorney, Agent, or Firm—Louis Bernat

[57] ABSTRACT

A video signal slow-motion or still picture reproduction system comprises at least one rotary video head for scanning a tape recorded with an FM video signal on tracks formed obliquely with respect to the longitudinal direction of the tape, a drum pulse obtaining circuit for obtaining a drum pulse in phase synchronism with the rotation of the rotary video head, a counting pulse generation circuit for generating a counting pulse in phase synchronism with the rotation of said rotary video head and having a repetition frequency sufficiently high with respect to the drum pulse, a noise detection pulse generation circuit for generating a noise detection pulse having a pulse width equal to a period in which an envelope of the FM video signal reproduced by the reproducing circuit is lower than a predetermined level, when the envelope of the FM video signal reproduced by the reproducing circuit is lower than the predetermined level, a calculation circuit supplied with the drum pulse, the counting pulse, and the noise detection pulse, for calculating an error between a point corresponding to a vertical blanking period of the reproduced FM video signal and a noise position within the reproduced FM video signal, and a circuit for driving the tape with a timing according to the calculated error obtained by the calculation circuit, and stopping the tape travel with a timing according to a value obtained by multiplying a coefficient to the error so that the noise position is within the vertical blanking period, to cause intermittent tape travel and to stop the tape travel.

7 Claims, 12 Drawing Figures

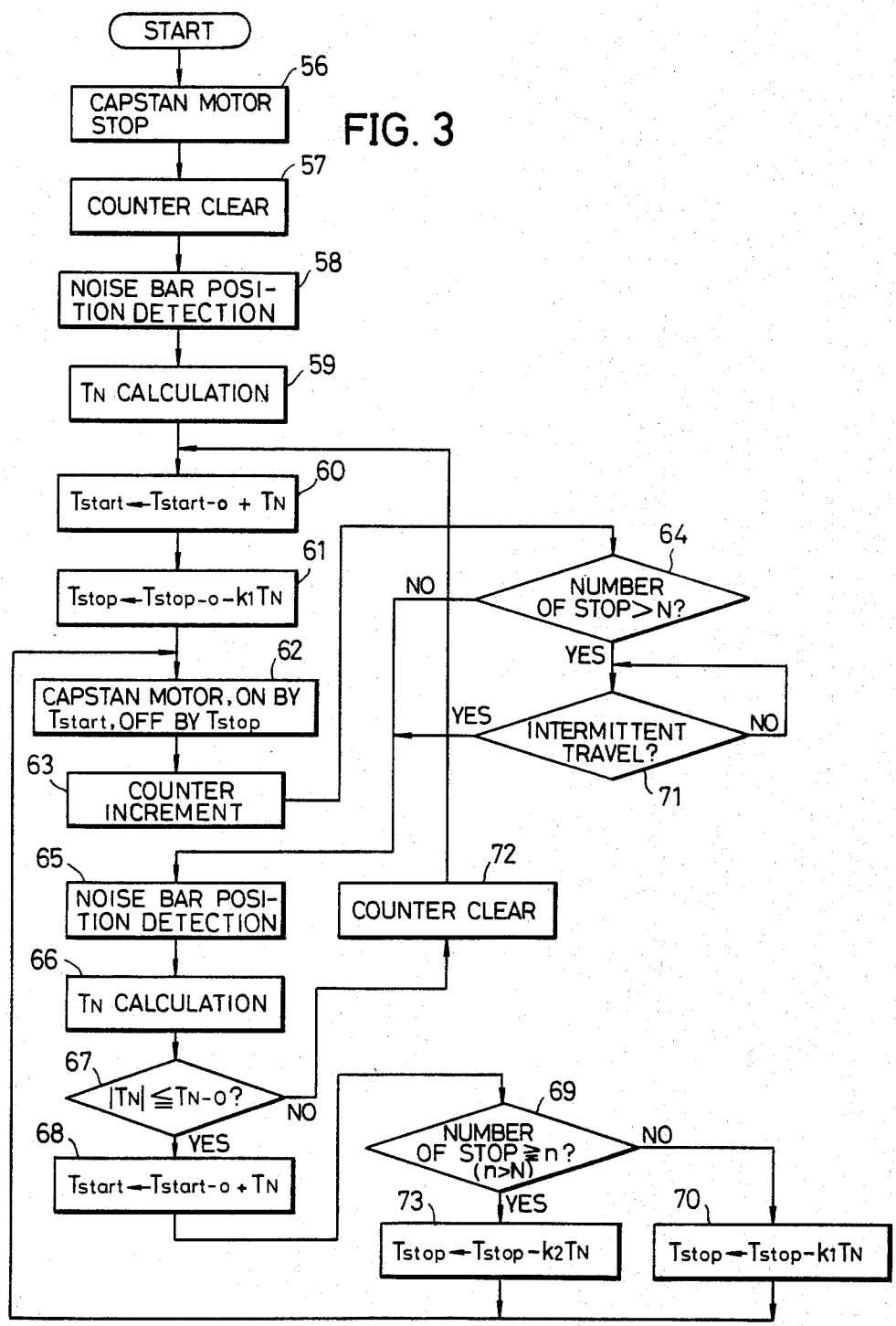

NOISE CONTROL CIRCUIT FOR SLOW-MOTION/STILL-MOTION VIDEO REPRODUCTION SYSTEM

BACKGROUND OF THE INVENTION

The present invention generally relates to video signal slow-motion or still picture reproduction systems, and more particularly to a system capable of performing slow-motion reproduction or still picture reproduction so that noise is not introduced in the reproduced picture.

Systems have been known wherein a video signal is recorded on a magnetic tape on parallel tracks formed obliquely with respect to the longitudinal direction of a magnetic tape. The magnetic tape travels at a speed which is different from that at the time of recording or stops, for carrying out speed-change reproduction such as quick-motion reproduction, slow-motion reproduction, or still picture reproduction. In such a system, because the tape speed upon speed-change reproduction is different from that at the time of recording, the path (track) over which a head traces over the tape during this speed-change reproduction is different from the path (track) on the tape traced by the head upon recording.

The conventional video signal recording and reproducing system ordinarily forms tracks on a recording medium in a manner which leaves an unrecorded zone or band called a guard band between adjacent tracks. This is in order to prevent beats from being generated when the head reproduces adjacent tracks due to tracking error upon normal reproduction. When the tape recorded in this manner is played back by speed-change reproduction as described above, the head traces over the track and the unrecorded band. When the head traces over the unrecorded band, the level of the reproduced signal becomes considerably low or becomes zero. For this reason, noise is introduced in the reproduced picture. Further, since the unrecorded bands are provided between the tracks in the above described system, the utilization efficiency of the tape was poor.

Accordingly, a system has been previously proposed wherein tracks are formed on the tape without gaps formed between the adjacent tracks, and moreover, a color video signal can be recorded and reproduced without introducing beat disturbance. Such a system is disclosed in the U.S. Pat. No. 4,178,606 entitled "COLOR VIDEO SIGNAL RECORDING AND-/OR REPRODUCING SYSTEM" issued on Dec. 11, 1979 and assigned to the same assignee as that of the present application. In this previously proposed system, a pair of heads having gaps of mutually opposite azimuth angles with respect to a direction perpendicular to the longitudinal direction of the track are used, and the adjacent tracks are formed in contiguous contact side-by-side without a gap formed therebetween. The phase of the chrominance signal is shifted by 90° for every horizontal scanning period. Moreover, the direction of this phase shift is reversed for every adjacent track. According to this system, the tape utilization efficiency is high since the tracks are in close contact with each other. In addition, the beat disturbance is not introduced.

Then, another system was proposed which uses the above proposed system. In this system, a plurality of rotary heads having gaps with centers along the track width direction which are different in height positions with respect to the rotational planes in which the heads travel, are used. The magnetic tape travels at a speed V which satisfies the following equation, where Vo is the tape speed for normal reproduction (and recording), and n is a positive or negative integer.

$$V = Vo\left(\frac{n-1}{n}\right)$$

Hence, the tape may be stopped or caused to travel so as to carry out still picture reproduction or slow-motion reproduction.

This latter proposed system is capable of carrying out slow-motion reproduction or still picture reproduction with reduced noise. However, the magnetic tape must travel at a speed satisfying the above equation. This gives rise to a problem in that slow-motion reproduction cannot be carried out at arbitrary speeds. Moreover, when the traveling magnetic tape is to be stopped for still picture reproduction, the position where the magnetic tape stops is not controlled. Accordingly, the operator must search for a position to stop the magnetic tape where the noise is minimum, while monitoring the reproduced picture screen. Thus, there is a disadvantage in that the operation is quite troublesome to perform.

Accordingly, in the U.S. Pat. No. 4,246,616 in which the assignee is the same as that of the present application, a system was proposed for reproducing a video signal in a slow-motion or still picture reproduction mode, in order to overcome the above described problems.

In this third proposed system for reproducing a video signal in a slow-motion or still picture reproduction mode, the video signals are recorded along video tracks on the tape. The video tracks extend obliquely with respect to the longitudinal direction of the tape, with substantially no gap formed therebetween. A control signal is recorded along a control track extending in the longitudinal direction of the tape, and the video tracks are recorded by a plurality of rotary video heads having gaps of mutually different azimuth angles. The control signal is recorded along the control track interrelatedly with the recording of the video tracks by the video heads. A motor drives the tape to travel or stop. The plurality of rotary video heads successively trace over the video tracks to pick up and reproduce the recorded video signals. The gaps of the rotary video heads have different height positions above the plane of rotation of the centers of the tracks in the width direction of the track. The control signals are reproduced from the control track of the traveling tape. A circuit delays the reproduced control signal by a predetermined delay time, to obtain a delayed signal, and uses this delayed signal to stop the motor and the tape trave. The tape is stopped at a position relative to the video heads which perform reproduction, so that the time instant when the level of the reproduced video signal becomes a minimum is within or in the vicinity of the vertical blanking period.

According to this third proposed system, still picture reproduction during the above slow-motion reproduction is carried out in a state without generating noise, and thus, the slow-motion reproduction as a whole is carried out without generating noise. By selecting the above described still picture reproduction at will, slow-motion reproduction can be carried out with an arbitrary slow-motion ratio. In addition, still picture reproduction can be carried out by continuing the above still picture reproduction period.

When performing the above slow-motion reproduction or the still picture reproduction, it is necessary to stop the magnetic tape at a most suitable position with respect to the rotary video heads by tape travel stopping means. Conventionally, as this tape travel stopping means, there was means for immediately stopping the rotation of a capstan motor by short-citcuiting the terminals thereof, means for stopping the tape travel by using the inertia of the capstan and a flywheel and taking into account the magnitude of the braking with respect to the capstan motor, and means provided with a second control head for immediately stopping the rotation of the capstan motor when this second control head reproduces a control pulse.

However, in the above conventional tape travel stopping means, although the reproduced control signal is used as a reference signal for stopping the tape travel, there is no feedback to determine whether the noise is actually within the vertical blanking period and does not appear in the reproduced picture. Thus, after the control pulse is detected, discrimination could not be performed to determine whether the magnetic tape is actually stopped at the most suitable stopping position. Accordingly, in the conventional reproducing system, if the various conditions with respect to the mechanisms in the VTR change, it became necessary to re-adjust the tracking every time such change is introduced.

SUMMARY OF THE INVENTION

Accordingly, it is a general object of the present invention to provide a novel and useful video signal slow-motion or still picture reproduction system in which the above described disadvantages have been overcome.

Another and more specific object of the present invention is to provide a video signal slow-motion or still picture reproduction system in which an error between a point corresponding to the vertical blanking period and a noise position within a reproduced signal is calculated from a signal in synchronism with the rotation of rotary video heads and the reproduced signal including the noise position information which is reproduced from the video tracks by the rotary video heads, and a magnetic tape travel driving device is controlled according to the calculated result so that the noise position is within the vertical blanking period. According to the system of the present invention, the servo system for the magnetic tape travel can be constructed from a closed loop. Hence, even if the various conditions with respect to the VTR change, manual re-adjustment of the tracking is unnecessary, and moreover, the processing of the tape travel control can be stably performed.

Still another object of the present invention is to provide a video signal slow-motion or still picture reproduction system in which the control of the tape travel can be performed as long as the reproduced signal from the rotary video heads includes the noise information in some form, and further, the frequency characteristic and the gain of the whole system can be set regardless of the response characetristic of the mechanisms in the VTR, by controlling the magnetic tape travel driving device with a software process using a micro-computer.

Other objects and further features of the present invention will be apparent from the following detailed description when read in conjunction with the accompanying drawings.

BRIEF DESCRIPTION OF THE DRAWINGS

FIG. 3 is a flow chart for explaining the operation of a central processing unit within the block system shown in FIG. 1;

DETAILED DESCRIPTION

Figure 1:
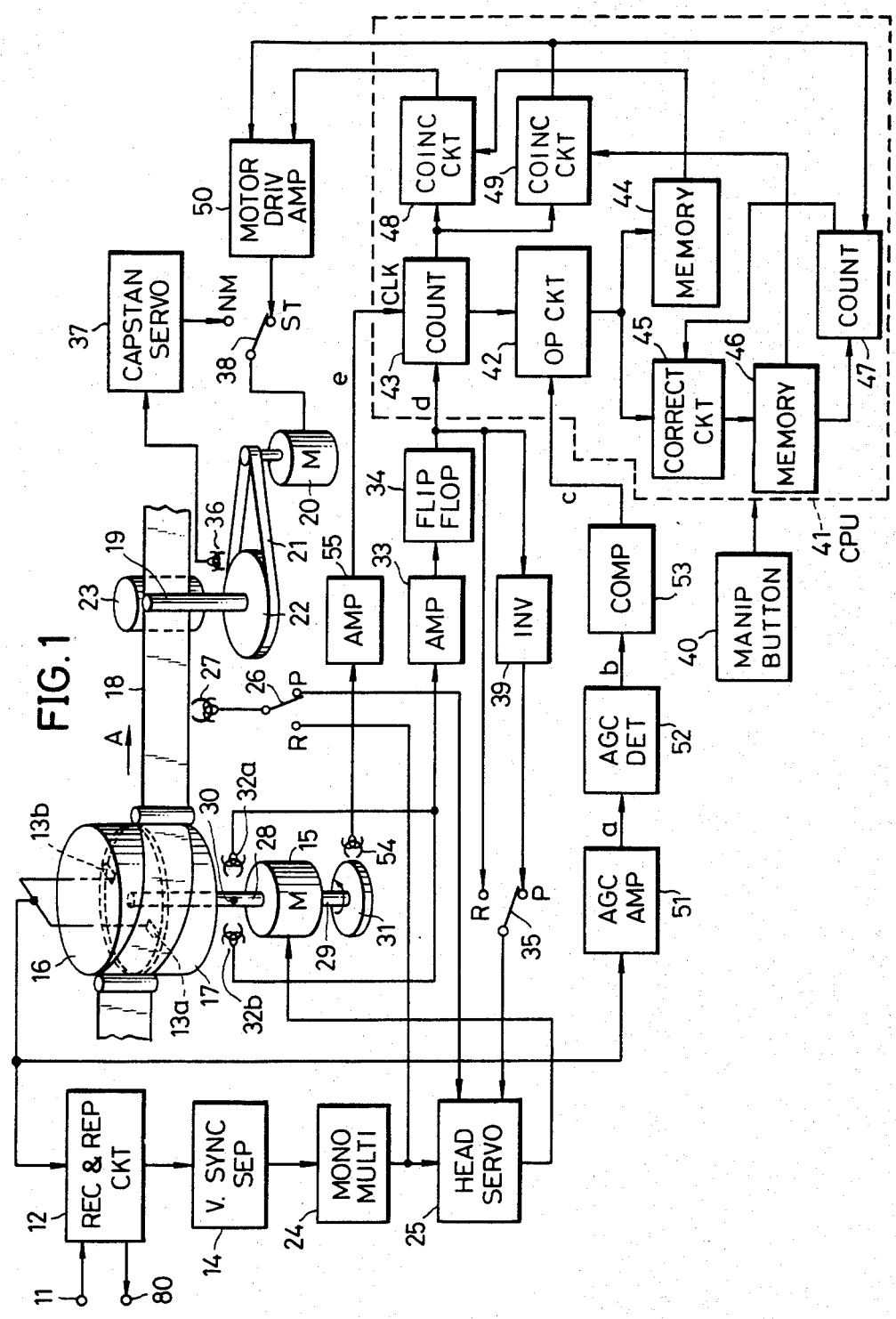
FIG. 1 is a systematic block diagram showing an example of a recording and reproducing system applied with an embodiment of a video signal slow-motion or still picture reproduction system according to the present invention.

First, description will be given with respect to a recording system. In FIG. 1, a video signal to be recorded which is obtained from an input terminal 11, is at least frequency-modulated and formed into an FM signal at a recording and reproducing circuit 12. The FM signal thus obtained, is supplied to a pair of recording and reproducing video heads 13a and 13b, and also to a vertical synchronizing signal separation circuit 14. As will be described hereinafter, the video heads 13a and 13b have mutually opposite azimuths, and mutually different track widths. These video heads 13a and 13b are mounted on diametrically opposite sides of a rotary drum 16 which is rotated at a rotational speed of 30 rps by a motor 15. A magnetic tape 18 is wound obliquely around the rotary drum 16 and a stationary drum 17. A capstan 19 is rotated by a motor 20 through a belt 21 and a flywheel 22, and the magnetic tape 18 is accordingly driven by the capstan 19 and a pinch roller 23 to travel in the direction of an arrow A. The FM video signal is alternately recorded by the video heads 13a and 13b along tracks which are oblique with respect to the longitudinal direction of the tape 18. Here, the tracks are formed contiguously, and the FM video signal is successively recorded on each track for one field.

On the other hand, a vertical syncrhonizing signal having a frequency of 60 Hz is separated from the video signal at the vertical synchronzing signal separation circuit 14, and is supplied to a monostable multivibrator 24 wherein the frequency is frequency-divided into ½, that is, into 30 Hz. An output signal of the monostable multivibrator 24 is supplied to a head servo circuit 25. This output signal of the monostable multivibrator 24 is also supplied to a control head 27 through a switch 26 which is connected to a contact R upon recording, and recorded along a lower edge of the tape 18 as a control signal.

Rotary shafts 28 and 29 are rotated together with the rotary drum 16, by the motor 15. A magnet 30 is provided on the rotary shaft 28, while a disc 31 is coaxially provided on the rotary shaft 29. The outer peripheral side of the disc 13 is magnetized with a constant repetition frequency. Every time the magnet 30 unitarily rotating with the rotary drum 16 passes a position separated from and opposing a gap surface of drum pickup heads 32a and 32b which are provided in a mutually opposing manner, the drum pickup heads 32a and 32b produce a pulse.

For convenience of expression, these pulses may be called "drum pulses" while parts 28, 32a, 32b, 33, 34 may be called a "drum pulse generating means". The drum pulse thus produced is supplied to a flip-flop 34 through an amplifier 33. The pulse is converted into a square wave d shown in FIG. 2(D) having a repetition frequency of 30 Hz. The square wave d is supplied to the head servo circuit 25 through a switch 35 connected to a contact R, as a comparison signal upon recording. Accordingly, the head servo circuit 25 generates a signal having a phase in synchronism with the vertical synchronizing signal of the video signal which is to be recorded. The signal generated by the head servo circuit 25 is applied to the motor 15, to rotate the motor 15 so that a constant relationship exists between the rotational phases of the heads 13a and 13b and the phase of the above vertical synchronizing signal.

Accompanied by the rotation of the capstan 19, a detection head 36 operates together with a magnet (not shown) provided on the flywheel 22, to detect rotation. A detected output of the detection head 36 is supplied to a capstan servo circuit 37 wherein an error with respect to a reference speed is detected. An output control signal of the capstan servo circuit 37 is applied to the capstan motor 20 through a switch 38 which is connected to a contact NM, to control the rotation of the capstan motor 20. Hence, the magnetic tape 18 travels at a predetermined speed, so that the tape 18 travels for one track pitch as the video heads 13a and 13b respectively undergo one-half revolution.

The above video heads 13a and 13b respectively have gaps with mutually opposite azimuth angles which are inclined by an angle $\alpha$ with respect to a direction perpendicular to the scanning direction. In addition, the heads 13a and 13b respectively have track widths W1 and W2 (where W1>W2), for example. These heads 13a and 13b are provided so that the end surfaces lie in the same reference plane of the rotary drum 16. Accordingly, as the video heads 13a and 13b alternately scan over the magnetic tape 18, a track portion of a track width W1−W2 is erased from a track having a track width W1 which is recorded by the head 13a, when a new signal is recorded by the head 13b. Thus, the tracks formed obliquely with respect to the longitudinal direction of the tape, are always recorded and formed with a constant track width W2.

Next, during normal reproduction, the switches 26 and 35 are switched and connected to contacts P, while the switch 38 remains connected to the contact NM. The control signal reproduced by the control head 27 is supplied to the head servo circuit 25 through the switch 26, as a reference signal for a phase control system. In addition, the output square wave d of the flip-flop 34 is also supplied to the head servo circuit 25 through an inverter 39 and the switch 35, as a comparison signal for the phase control system. Hence, the head servo circuit 25 supplies a signal for controlling the rotation to the motor 15, so that the video heads 13a and 13b always scan over the recorded tracks. Here, because the control head 27 produces a positive polarity pulse which coincides with the rotational phase of the head 13a, for example, the rotational phase of the heads 13a and 13b are controlled so that the heads 13a and 13b always scan over the tracks recorded by these heads 13a and 13b, and the so-called reverse tracking will not occur. The FM video signal thus reproduced by the heads 13a and 13b is converted into the video signal of the original signal format at the recording and reproducing circuit 12, and produced from an output terminal 80.

Next, description will be given with respect to the operation when a still picture reproduction is performed. During the still picture reproduction, the travelling magnetic tape 18 is stopped, and the video heads 13a and 13b are rotated at a rotational speed which is the same as that upon recording.

Figure 6:
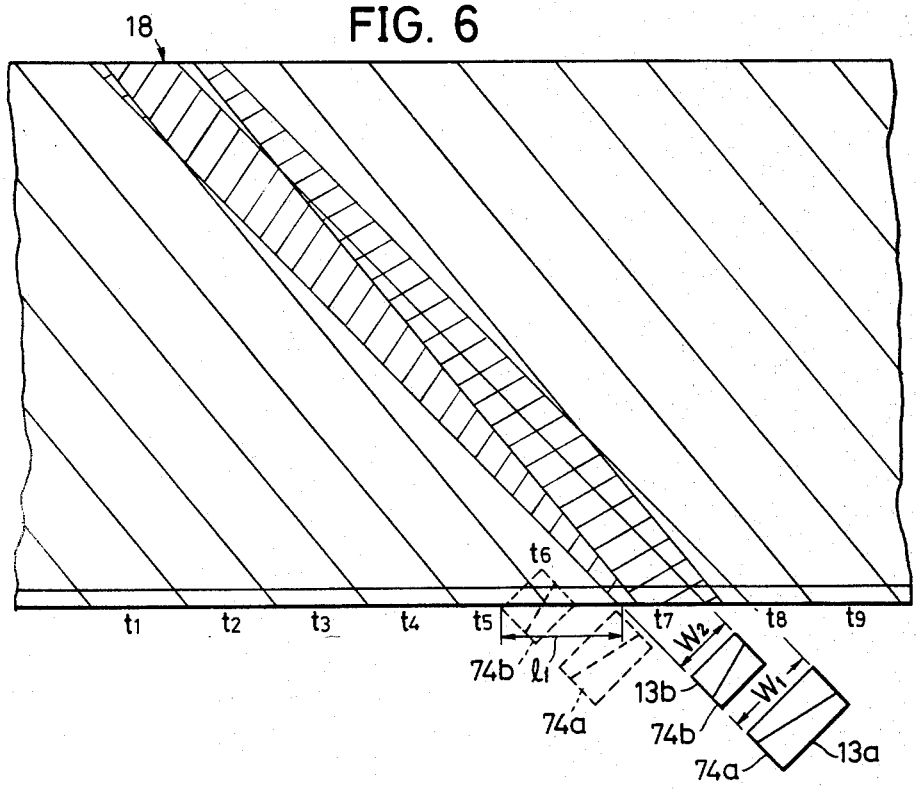
FIG. 6 shows a scanning track pattern upon still picture reproduction.

Referring to FIG. 6, when the head 13b, for example, starts to scan from a position straddling tracks t6 and t7, the head 13b scans along a path indicated by a bold full line and terminates the scanning at a position straddling the tracks t5 and t6. Since the tape 18 is stopped, the head 13a also starts to scan from a position straddling the tracks t6, t7, and t8, so that an end face 74a traces the same path as that of an end face 74b of the head 13b. The scanning by the head 13a is terminated at a position straddling the tracks t5, t6, and t7. Thereafter, the above described scanning operation is repeated.

The heads 13b and 13a respectively have a normal tracking relationship with respect to the tracks t6 and t7. Assume a case where the relative scanning positions of the heads 13a and 13b with respect to the tape are offset, for example, towards the left from the states shown in the figure. In this case, the reproducing level increases upon starting of the scanning of the track t6 by the head 13b. But, the reproducing level decreases upon completion of the scanning. Furthermore, the reproducing period at the maximum level of the head 13a with respect to the track t7 becomes short, and the proportion of the track t5 scanned upon completion of the scanning with respect to the track t7 increases. For this reason, beat interference is introduced in the joint portion between the signals reproduced by the respective heads. On the other hand, when the relative scanning positions of the heads 13a and 13b are offset towards the right from the states shown in the figure, the reproducing level decreases from the track t6 of the head 13b, and the signal-to-noise (S/N) ratio at this reproducing portion greatly deteriorates. Therefore, the most desirable state of the scanning path of the heads 13a and 13b relative to the tracks upon still picture reproduction, is that indicated in FIG. 6.

In the present embodiment of the invention, at a point where the control head 27 reproduces the control signal, the video head 13a or 13b is at a position shown by a dotted line in FIG. 6, and the magnetic tape 18 stops after moving a distance l1 from the above position of the video head.

In FIG. 1, when a still picture reproduction button in a manipulation button 40 is pushed, a central processing unit (CPU) 41 within a micro-computer is started (actually, a program stored in the micro-computer is started by an interrupt instruction). In addition, the switches 26 and 35 are connected to the contacts P, and the switch 38 is connected to a contact ST. By the starting of the CPU 41, a start command obtained from a coincidence circuit 48 within the CPU 41 is applied to the capstan motor 20, through a motor driving amplifier 50 and the switch 38, to start the capstan motor 20. After a preset predetermined time has elapsed, a stop command is produced from a coincidence circuit 49. This stop command is applied to the capstan motor 20 through the motor driving amplifier 50 and the switch 38, to stop the rotation of the capstan motor 20. The above predetermined time is selected to a value in the order of the traveling time of the magnetic tape 18 as the magnetic tape 18 travels and two tracks among the tracks formed on the tape move a distance (corresponding to one frame) along the longitudinal direction of the tape. Because this predetermined time is a fixed time within the program, the magnetic tape 18 is not always stopped at the most suitable position where the niose bar is not generated, when the mechanical characteristics of the VTR is greatly different from anticipated values preset when forming the program or when tracking error exists during normal reproduction. That is, as the CPU 41 is started, the capstan motor 20 is suitably rotated before being stopped.

When the tape travel is stopped as described above, a counter 47 for counting the number of frames (number of times when the capstan motor 20 is stopped) in the tape travel after the mode is in the still picture reproduction mode, is cleared by the first stop command. If the processing performed by the micro-computer is sufficiently fast, the clearing of the counter 47 may be carried out first.

Means are provided for generating noise detection pulses. More specifically, the position of the noise bar is detected in a state where the magnetic tape travel is stopped. The FM video signal recorded on oblique tracks on the magnetic tape 18, is alternately reproduced by the heads 13a and 13b. The reproduced FM video signal is demodulated at the recording and reproducing circuit 12, and produced through the output terminal 80. On the other hand, the reproduced FM video signal is also supplied to an AGC amplifier 51 and formed into a signal a shown in FIG. 2(A). This signal a is detected of the envelope at an AGC detector 52, and formed into a signal b shown in FIG. 2(B). This signal b is supplied to a comparator 53 wherein the signal b is compared with a predetermined threshold level and converted into a pulse c shown in FIG. 2(C). The pulse c is applied to an operational circuit 42 within the, CPU 41.

The drum pulse d is generated as described above, even in the state where the magnetic tape travel is stopped, the rotary drum 16 is rotated at a predetermined rotational speed by the motor 15 in synchronized rotation with the motor 15. The rotation of the motor 15 is detected by the magnet 28 and the drum pickup heads 32a and 32b. The output pulses of the drum pickup heads 32a and 32b are applied to the flip-flop 34 through the amplifier 33. Accordingly, the drum pulse d shown in FIG. 2(D) corresponding to the track scanning period of the heads 13a and 13b, is obtained from the flip-flop 34. The drum pulse d is applied to a counter 43 within the CPU 41, and resets the counter 43 by a rise in this drum pulse d.

Figure 2:
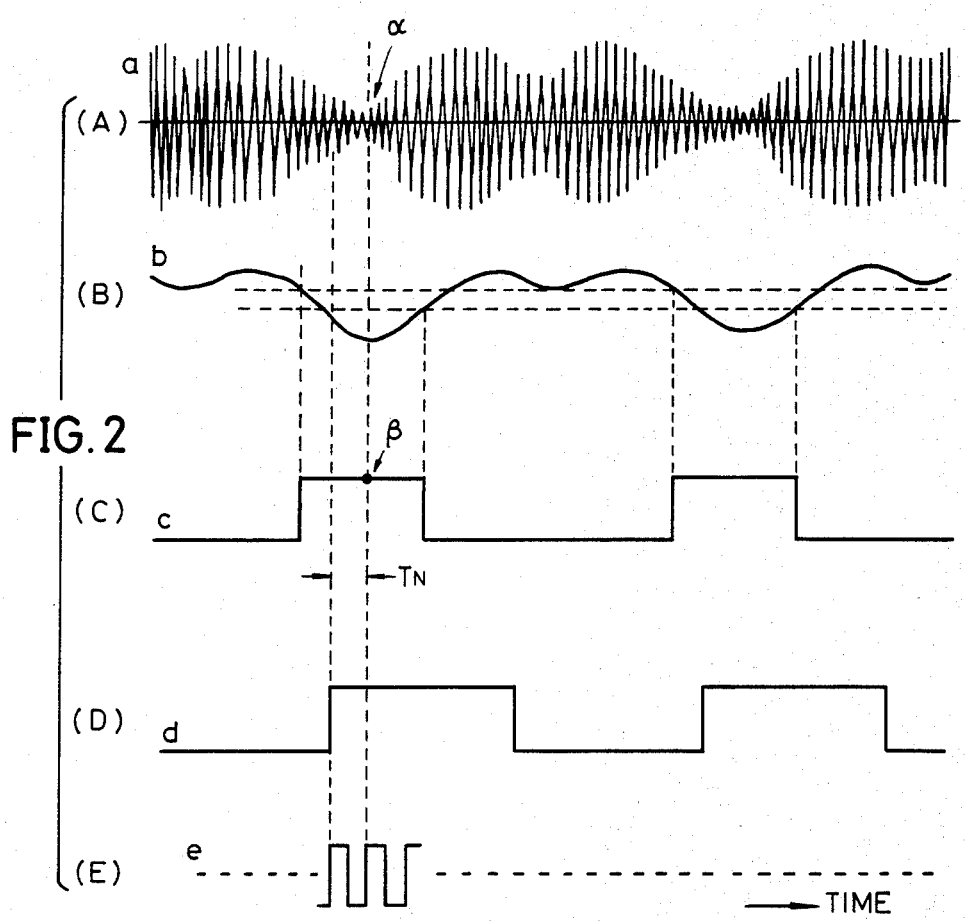
FIGS. 2(A) through 2(E) are time charts respectively showing signals at each part of the block system shown in FIG. 1.

Means are provided for generating counting pulses in phase with the rotation of the video heads. In greater detail, a high-frequency pulse (a pulse having a repetition frequency which is 120 times that of the drum pulse d, for example) in synchronism with the rotation of the rotary drum 16 is obtained from a head 54. This head 54 operates together with the permanent magnets provided at the peripheral surface of the disc 31 which is rotated unitarily with the rotary shaft 29. The above high-frequency pulse from the head 54 is amplified at an amplifier 55, and formed into a counting pulse e shown in FIG. 2(E) wherein the time base is expanded. The pulse e is applied to the counter 43 within the CPU 41 wherein the pulses are counted. The above pulse counting e is stored within the CPU 41 as the minimum time unit for control. In FIG. 2(E), the counting pulse e is shown with an expanded time base, as compared to the signals shown in FIGS. 2(A) through 2(D). For example, 120 series of pulses are transmitted within one period of the drum pulse d. Normally, the micro-computer is provided with an internal clock (the micro-computer is interrupted by a pulse from an oscillator, to obtain a clock by counting the interrupts every time, the micro-computer is interrupted), and the above counting pulse e is used in the present embodiment instead of the pulse from the oscillator.

Means are provided for calculating errors between a vertical blanking position and a noise bar position. More particularly, the operational circuit 42 latches the counted values in the counter 43 respectively at the point when the pulse c rises and at the point when the noise pulse c falls, respectively, and calculates a center value $T_N$ (indicated by $\beta$ in FIG. 2(C)) for the pulse width of the pulse c from both the above counted values. Because the counter 43 is reset by the rise in the drum pulse d, the value $T_N$ indicates the counted value of the counting pulse e from the rise in the drum pulse d to the center $\beta$ of the noise pulse c as shown in FIGS. 2(C) and 2(D). This value $T_N$ will hereinafter be referred to as an error value. At the time when the drum pulse d rises, the head 13a or 13b is at a position indicated by a solid line in FIG. 6. At the position shown in FIG. 6, the noise bar is least conspicuous because the position of the noise bar is within the vertical blanking period of the reproduced video signal.

The above center $\beta$ and the minimum level position $\alpha$ (that is, the noise bar position) of the reproduced FM video signal a shown in FIG. 2(A) does not always coincide. However, since there substantially is no difference in phase between the noise bar position $\alpha$ and the center $\beta$, the center $\beta$ is assumed to be the noise bar position in the present embodiment of the invention.

The reproduced FM video signal a also includes noise due to dropout which is introduced by scratches and the like formed on the magnetic tape 18 itself. In some cases, the pulse width becomes considerably large when the state of contact between the tape and the heads 13a and 13b is poor. In such a case, it becomes difficult to judge which is the actual noise and where the noise is located, although this judgement is performed by the micro-computer. Here, as an example, it is assumed that the widest pulse is the noise of interest, and the position of the noise is assumed to be at the center of the pulse.

After the position of the noise bar is detected and the error value $T_N$ of the noise bar is calculated, the capstan motor 20 is started with a timin $T_{start}$ which is calculated according to the equation $T_{start}T_{\leftarrow start}+T_N$ and the capstan motor 20 is stopped from rotating with a timing $T_{stop}$ which is calculated according to the equation $T_{stop} \leftarrow T_{stop} - K1T_N$. In the above equation, K1 is a predetermined constant.

The operational circuit 42 also adds the above error value $T_N$ to a value $T_{start-0}$ obtained when the magnetic tape 18 is stopped at the most suitable position. This added value is stored into a memory 44, and also supplied to a correction circuit 45. The correction circuit 45 stores a value obtained by subtracting $K1T_N$ from the previous data $T_{stop-0}$ into a memory 46.

When the counted value in the counter 43 coincides with the value read out from the memory 44 which satisfies the correction equation $T_{start} \leftarrow T_{start-0} + T_N$, the coincidence circuit 48 generates a start command. This start command is applied to the capstan motor 20 through the motor driving amplifier 50 and the switch 38, to re-start the capstan motor 20. If the magnetic tape 18 is stopped at a position advanced by the error value $T_N$ with respect to the most suitable stopping position, for example, the starting timing of the capstan motor 20 is delayed by the error value $T_N$ from the logic value $T_{start-0}$ according to the above equation the next time the capstan motor 20 is started.

The above correction equation for the starting timing is refreshed every time the magnetic tape is intermittently moved. The correction value is determined by the error value itself. This is not only effective in preventing the switching noise, but also enables processing in the later stages to be performed as though the magnetic tape 18 is stopped at the most suitable stopping position.

Figure 4:
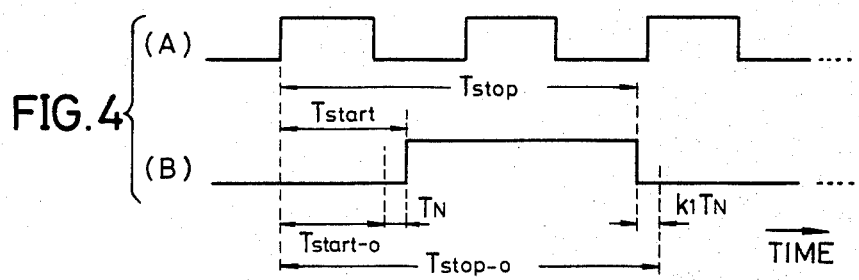
FIGS. 4(A) and 4(B) are graphs showing the relationship between a drum pulse and a capstan motor driving waveform, for explaining the operation of each part in the block system shown in FIG. 1.

Next, at a point when the counted value in the counter 43 coincides with the output value ($T_{stop} \leftarrow T_{stop-0} - K1T_N$), the coincidence circuit 49 generates a stop command. This stop command is applied to the capstan motor 20 through the motor driving amplifier 50 and the switch 38, to stop the rotation of the capstan motor 20. FIG. 4(A) shows a drum pulse, and FIG. 4(B) shows a driving signal waveform for the capstan motor 20. As clearly seen from FIGS. 4(A) and 4(B), $T_{stop}$ determines the driving time (the time indicated by high level in FIG. 4(B)) of the capstan motor 20. Every time the tape is moved intermittently, the previous data (the driving time of the capstan motor 20) is corrected by the resultant error value $T_N$, to determine the next driving time of the capstan motor 20. Here, because there is no previous data in this case, the first correction is performed by assuming that the previous data is $T_{stop-0}$. By using the data $T_{start}$ and $T_{stop}$ thus obtained, the CPU 41 drives and controls the capstan motor 20. Further, every time a data is written into the memory 46, the counted value in the counter 47 for counting the number of times stopped, is incremented by one.

Figure 5:
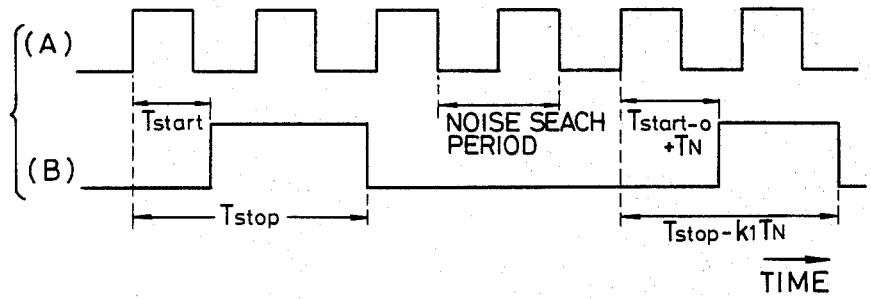
FIGS. 5(A) and (B) are graphs showing the relationship between a drum pulse and a capstan motor driving waveform, for explaining the operation of each part in the block system shown in FIG. 1.

The above detection to locate the noise bar is performed within one period of the drum pulse shown in FIG. 5(A) and within the low-level period of the driving signal waveform for the capstan motor 20 shown in FIG. 5(B) which corresponds to the period in which the rotation of the capstan motor 20 is stopped.

Next, when the first tape travel is completed, it is determined whether the counted value in the counter 47 corresponding to the number of times stopped, is equal to or larger than N at a comparator (not shown), where N is a natural number and equal to three, for example. If the counted value in the counter 47 is larger than N, the operation of the CPU 41 is stopped. On the other hand, if the counted value in the counter 47 is smaller than N, the above described detection of the noise bar and the calculation of the error value $T_N$ is performed again, and discrimination is then made to determine whether the absolute value of the error value $T_N$ is equal to or smaller than a specific value $T_{N-0}$ (that is, a range wherein the noise is within the vertical blanking period) at the operational circuit 42. If the absolute value of the error value $T_N$ is larger than the value $T_{N-0}$, it is determined that a large deviation has occurred, and the operation is started over again from the beginning. This is for the following two reasons. That is, at the early stage of the learning process, the learning gain in the system is high, and a ridiculous value may be obtained because the value of $T_{stop}$ is the learning value. Moreover, if the number of learning process performed is exceedingly large, the learning gain is reduced, and the absolute processing speed of the CPU 41 to detect the noise bar and calculate the error value becomes too slow.

In a case where the absolute value $|T_N|$ of the above error value $T_N$ is smaller than $T_{N-0}$, the counter 47 calculates the value $T_{start}$ for the starting timing, and then determines whether the number of times stopped is equal to or over n (n is a natural number satisfying n > N, and is equal to 10, for example). If the number of times stopped is smaller than n, the coefficient K1 is maintained in the correction circuit 45, and a stopping timing value $T_{stop}$ satisfying the equation $T_{stop} \leftarrow T_{stop} - K1T_N$ is produced from the memory 46. On the other hand, if the number of times stopped is equal to or larger than n, the coefficient in the correction circuit 45 is changed to K2, and a stopping timing value $T_{stop}$ satisfying the equation $T_{stop} \leftarrow T_{stop} - K2T_N$ is produced from the memory 46. The number of times stopped only becomes larger than n upon slow-motion reproduction. In the above equations, K1 and K2 satisfy a relation $0 < K2 < K1 < 1$. The correction equation for the stopping timing value $T_{stop}$ is changed according to whether the number of times stopped is equal to or larger than n, because even though the error value $T_N$ is normally zero, the error value $T_N$ may assume a value in error by a large margin even when $T_N$ is actually zero. The gain of the system is selected as described above in order to reduce the erroneous operation to a minimum. In the above equation, K1 is substantially equal to one.

Hence, during the still picture reproduction, the magnetic tape 18 is caused to travel intermittently at least N times, according to the control performed by the CPU 41 with respect to the capstan motor 20. Thereafter, the magnetic tape 18 is stopped at the above most suitable stopping position, and the still picture reproduction is performed at that stopping position.

The processing order of the CPU 41 upon still picture reproduction will now be described in conjunction with the flow chart shown in FIG. 3. When the CPU 41 is started by pushing the still reproduction button, the capstan motor 20 is rotated, and the rotation of the capstan motor 20 is then stopped with a suitable timing at a step 56. Next, the counter 47 is cleared by the first stop command at a step 57, so that the number of times stopped becomes zero. The position of the noise bar is detected at a step 58, and the error value $T_N$ is calculated at a step 59. The value $T_{start}$ is calculated and obtained by adding $T_N$ to the logic value $T_{start-0}$ related to the most suitable stopping position, at a step 60. The value $T_{stop}$ is calculated and obtained by subtracting $K1T_N$ from the previous data $T_{stop-0}$ at a step 61. The capstan motor 20 is driven after a period corresponding to $T_{start}$ has elapsed from the rise in the drum pulse d, and is stopped after a period corresponding to $T_{stop}$ has elapsed from the above rise in the drum pulse d, at a step 62.

Then, the counted value in the counter 47 is incremented by one at a step 63, and it is determined whether the number of times stopped is equal to or larger than N at a step 64. Because the number of times stopped is smaller than N at first, the CPU 41 again detects the position of the noise bar in a step 65, and again calculates the error value $T_N$ of the noise bar in a step 66. The CPU 41 further determines whether the absolute value of $T_N$ is equal to or larger than the above predetermined value $T_{N-0}$ in a step 67. If the absolute value of $T_N$ is smaller than the predetermined value $T_{N-0}$, the value $T_{start}$ is obtained by adding $T_N$ to $T_{start-0}$ in a step 68. Next, the CPU 41 determines whether the number of times stopped is equal to or larger than n in a step 69. Because the number of times stopped is smaller than n during the still picture reproduction, the operation is advanced to a step 70 wherein the value of $T_{stop}$ is calculated from the correction equation $T_{stop} - K1T_N$. The operation is then returned to the steps 62, 63, and 64 in this order. When the above described operation is repeated N times, the operation is advanced to a step 71 from the step 64, to determine whether the tape is undergoing intermittent tape travel. Since the tape does not undergo intermittent tape travel during the still picture reproduction mode, the CPU 41 continues to stop the rotation of the capstan motor 20.

In a case where the absolute value of the error value $T_N$ is larger than $T_{N-0}$ in the step 67, the counter 47 is cleared at a step 72 to set the number of times stopped to zero, and the operation then advances to the step 60. The operation to detect the position of the noise bar is thereafter performed over again from the start.

On the other hand, if a slow-motion reproduction button in the manipulation button 40 is pushed, the CPU 41 performs steps similar to those upon the above described still picture reproduction. However, the discrimination at the step 64 is not performed during the slow-motion reproduction mode, and an operation is steadily and repeatedly performed to cause intermittent tape travel. When it is determined that the number of times stopped is equal to or larger than n at the step 69, the operation is advanced to a step 73 wherein the value of $T_{stop}$ is changed to a value obtained by subtracting $K2T_N$ from the previous data. The operation is then advanced to the step 62. The period with which the tape undergoes intermittent tape travel, varies according to the slow-motion ratio. For example, by repeatedly performing an operation in which normal reproduction is carried out for two fields and the magnetic tape 18 is stopped at the most suitable stopping position according to the system of the present invention to carry out still picture reproduction for the succeeding two fields, a reproduced picture substantially having no noise bar is obtained where the slow-motion is a ½-speed slow-motion in an average.

As clearly understood from FIG. 3, even when the tape is caused to undergo intermittent tape travel upon reproduction, the reproduced picture obtained in this case is also of a high quality having no noise.

In the above described embodiments of the present invention, description was given with respect to a case where a magnetic tape having a tape pattern recorded and formed by the azimuth recording system is reproduced. However, the present invention can of course be applied to a magnetic tape having a tape pattern wherein guard bands are provided.

Further, the present invention is not limited to these embodiments, but various variations and modifications may be made without departing from the scope of the present invention.

What is claimed is:

1. A video signal slow-motion or still picture reproduction system comprising:

reproducing means for scanning a tape recorded with an FM video signal on tracks formed obliquely with respect to the longitudinal direction of the tape, said reproducing means comprising at least one rotary video head for reproducing the FM video signal from said tracks;

tape driving means for driving said tape to travel;

drum pulse obtaining means for obtaining a drum pulse in phase synchronism with the rotation of said rotary video head;

counting pulse generation means for generating a counting pulse in phase synchronism with the rotation of said rotary video head and having a repetition frequency sufficiently high with respect to said drum pulse;

noise detection pulse generation means for generating a noise detection pulse having a pulse width equal to a period in which an envelope of the FM video signal reproduced by said reproducing means is lower than a predetermined level, when the envelope of the FM video signal reproduced by said reproducing means is lower than the predetermined level;

calculation means supplied with said drum pulse, said counting pulse, and said noise detection pulse, for calculating an error between a point corresponding to a vertical blanking period of the reproduced FM video signal and a noise position within said reproduced FM video signal; and intermittent tape travel and tape travel stopping means for driving said tape driving means with a timing according to the calculated error obtained by said calculation means, and stopping the tape travel by said tape driving means with a timing according to a value obtained by multiplying a coefficient to said error so that said noise position is within said vertical blanking period, to cause intermittent tape travel and to stop the tape travel.

2. A reproduction system as claimed in claim 1 in which said noise detection pulse generation means comprises an AGC detection circuit supplied with said reproduced FM video signal, for obtaining a detection signal substantially coinciding with the envelope of said reproduced FM video signal, and a comparator for comparing the levels of said detection signal and said predetermined level.

3. A reproduction system as claimed in claim 1 in which said calculation means comprises a counter reset by a leading edge of said drum pulse, for counting said counting pulse, and an operational circuit supplied with an output counted value of said counter and said noise detection pulse, for obtaining the number of said counting pulse in a period between the leading edge of said drum pulse and a center of the pulse width of said noise detection pulse.

4. A reproduction system as claimed in claim 1 in which said tape driving means comprises a capstan for causing said tape to travel and a capstan motor for rotating said capstan, and said intermittent tape travel and tape travel stopping means is means for supplying the driving signal to said capstan motor after a time in accordance with said error has elapsed from the leading edge of said drum pulse, and interrupting the supply of the driving signal to said capstan motor after a time obtained by subtracting said error multiplied by the coefficient from a previous data of the motor drive stoppage has elapsed, said leading edge of said drum pulse being generated with a timing such that the noise enters within said vertical blanking period.

5. A reproduction system as claimed in claim 1 in which said intermittent tape travel and tape travel stopping means intermittently drives said tape driving means a plurality of times, and said calculation means calculates said error every time the tape travel is stopped.

6. A reproduction system as claimed in claim 5 in which said intermittent tape travel and tape travel stopping means again intermittently drives said tape driving means a plurality of times, when an absolute value of an error calculated by said calculation means during the tape travel stopping period is larger than a specific value.

7. A reproduction system as claimed in claim 1 in which said intermittent tape travel and tape travel stopping means changes the value of said coefficient multiplied to said error when the number of times the tape is driven intermittently by said tape driving means upon slow-motion reproduction becomes equal to or larger than a certain number, so that said coefficient is smaller compared to when the number of times the tape is driven intermittently is smaller than said certain number.

* * * * *